United States Patent [19]

Pope et al.

[11] 4,319,122
[45] Mar. 9, 1982

[54] SYNCHRONOUS ARRANGEMENT AND METHOD FOR HEAT TREATING WORKPIECES

[75] Inventors: Peter J. Pope, Balcombe; Richard B. Willis-Owen, Horsham, both of England

[73] Assignee: Duracell International Inc., Bethel, Conn.

[21] Appl. No.: 176,167

[22] Filed: Aug. 7, 1980

[30] Foreign Application Priority Data

Feb. 20, 1980 [GB] United Kingdom ............... 05705/80

[51] Int. Cl.$^3$ ............................................. B23K 27/00
[52] U.S. Cl. ...................... 219/121 LC; 219/121 LR; 219/121 LU; 219/121 LY
[58] Field of Search ..... 219/121 L, 121 LM, 121 LC, 219/121 LD, 121 LG, 121 LN, 121 LW, 121 LU, 121 LY, 121 LV, 121 LK, 121 LL, 121 LH, 121 LJ, 121 EC, 121 ED

[56] References Cited

U.S. PATENT DOCUMENTS

| | | | |
|---|---|---|---|
| 3,440,392 | 4/1969 | Erlandson et al. | 219/121 EC |
| 3,617,702 | 11/1971 | Flournoy | 219/121 LK |
| 3,622,742 | 11/1971 | Cohen et al. | 219/121 LL |
| 3,663,793 | 5/1972 | Petro et al. | 219/121 LU X |
| 3,663,795 | 5/1972 | Myer | 219/121 LY X |
| 4,028,525 | 6/1977 | Mominee et al. | 219/121 LK |
| 4,063,064 | 12/1977 | Saunders et al. | 219/121 LK |
| 4,088,864 | 5/1978 | Theeuwes et al. | 219/121 LK X |
| 4,125,755 | 11/1978 | Plamquist | 219/121 LW X |

*Primary Examiner*—C. L. Albritton
*Attorney, Agent, or Firm*—Ronald S. Cornell; Israel Nissenbaum

[57] ABSTRACT

A method and arrangement for spot welding the anode structure of a succession of alkaline primary batteries with a focused beam of radiation generated by a stationary laser as the batteries are conveyed through the arrangement. The batteries are conducted along a circular work station in the form of a star wheel having the batteries arranged around a portion of its circumference. An optical focusing system is mounted for oscillation about the rotational axis of the star wheel in synchronous motion with each battery as it passes through the beam of radiation. The anode structure of each battery is positioned at the focal point of the optical focusing system whereby the optical focusing system focuses the radiation beam on one small area of the anode structure to produce a spot weld on the anode structure.

16 Claims, 6 Drawing Figures

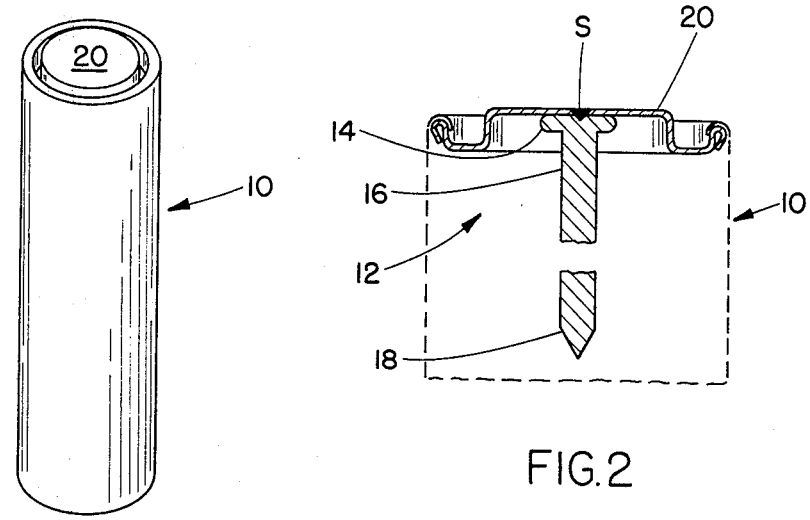
FIG. 1
FIG. 2
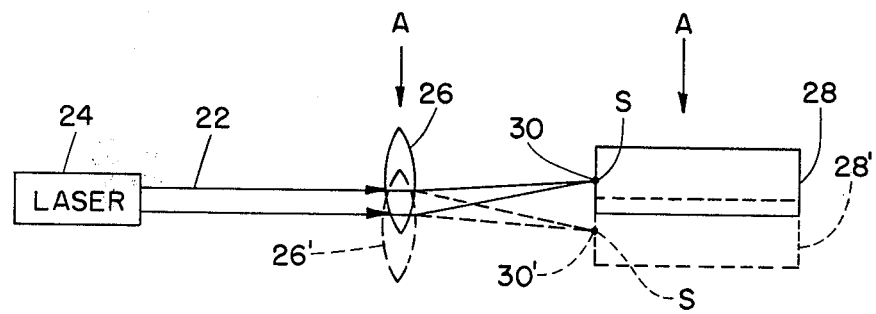
FIG. 3

SYNCHRONOUS ARRANGEMENT AND METHOD FOR HEAT TREATING WORKPIECES

BACKGROUND OF THE INVENTION

1. Field of the Invention

The present invention relates in general to an arrangement and method for heat treating a workpiece in motion with a beam of energy or radiation and, more particularly, pertains to an arrangement and method for utilizing a collimated laser beam to sequentially spot weld each of a plurality of moving workpieces which are successively conveyed through the laser beam.

2. Discussion of the Prior Art

Charschan et al. U.S. Pat. No. 4,151,014 discloses a laser annealing arrangement in which a predetermined segment of a metallic workpiece is annealed to a controlled degree of temper by irradiating that portion with a pulsed laser beam. The intensity of the beam and/or the pulse width thereof is regulated so as to impart the controlled degree of temper to the pertinent portion of the workpiece. The pulsed laser allows heat to be selectively applied to a particular portion of the workpiece in a manner which will rapidly elevate that portion to an annealing temperature. The prior art arrangement results in controlled annealing of one small portion of the workpiece with only negligible lateral conduction of heat into encompassing or adjacent areas of the workpiece. In the arrangement, a pulse from the laser is directed through a focusing lens onto the area of the workpiece which is to be annealed. Thus, Charschan et al. is directed to an annealing arrangement wherein all components of the system, including the workpiece, remain stationary throughout the annealing operation and, presumably after completion thereof, the selectively annealed stationary workpiece is removed and then replaced by another workpiece for a repetition of the annealing operation.

Ralston et al. U.S. Pat. No 3,663,301 discloses an alkaline dry cell primary battery which incorporates a construction in which a spot weld is provided between an external circular anode plate and an internal anode collector so as to form a fixed connection between these elements. Various types of welding equipment have heretofore been utilized to perform this spot welding operation, however, all of these prior art arrangements necessitated the battery to be maintained stationary during the performance of the welding operation. The need for the stationary positioning of the battery during the spot welding operation imparted a limitation to these prior welding arrangements in that it resulted in a relatively time-consuming and expensive welding operation. The usual economic goal of achieving low cost mass production and developing a higher rate of production output for each unit of time has always been a pressing and desirable factor in the development of cells of this type, inasmuch as primary batteries are essentially "throw-away" products which are electrically depleted during normal usage and are discarded after the chemical components therein are essentially completed coverted into an electrically inactive condition. Furthermore, the evolution and development of alkaline dry cells has resulted in the achievement of greatly improved performance and power output in that type of cell which has led to the utilization thereof in many fields of application wherein primary electrical chemical cells had heretofore generally not been in common usage.

Consequently, automating to a greater degree the spot welding operation which is performed between the internal anode collector and the exterior element forming one terminal of this cell while conveying the cell through its manufacturing apparatus represents a significant improvement in the state of the art of producing alkaline dry cell primary batteries, and facilitates the production of such batteries in a more cost effective and time saving manner.

SUMMARY OF THE INVENTION

Accordingly, in order to overcome or substantially ameliorate the limitations encountered in the prior art, the present invention contemplates the provision of a novel method and arrangement for treating a moving workpiece with a beam of radiation generated by a relatively stationary radiation source. In more precise detail, the present invention provides a method and arrangement for performing a spot welding operation on a plurality of primary batteries in which the batteries each have spot welds imparted thereto at predetermined locations as they are sequentially conveyed through the welding arrangements.

Pursuant to one aspect of the invention, a novel arrangement and method are disclosed for the treatment of a moving workpiece with a beam of radiation which is generated as a collimated beam from a generally stationary radiation source. Each workpiece is conveyed in synchronism with an optical focusing system through the collimated beam of radiation, with the workpiece being essentially positioned at the focal point of the optical system. The arrangement is such that the collimated beam is directed so as to be focused on a single spot of the moving workpiece during the interval when the optical system and workpiece are conveyed in synchronism through the collimated radiation beam.

Furthermore, in a preferred embodiment of the invention, the collimated beam of radiation is generated by a laser which is operated in a pulsed mode, producing at least one pulse of collimated radiation for each workpiece conveyed through the laser beam. Moreover, in the disclosed embodiment of the invention, the laser produces a beam of radiation of sufficient intensity and pulse duration to produce a spot weld on each workpiece at the focal point of the focused beam. In addition thereto, the workpieces are conveyed in sequence past the laser, with a single optical system being periodically conveyed in synchronism with each workpiece along a predetermined short path of movement. The periodic movement of the optical system is produced by mounting the optical focusing system oscillating motion within the arrangement, and employing a rotatable cam adapted to periodically oscillate the optical focusing system in synchronism with each workpiece which is conveyed through the laser beam. More specifically, the workpieces are conveyed along a continually rotating circular work station with the workpieces being arranged about at least a portion of the circumference thereof, and with the optical focusing system being mounted for reciprocation or oscillation about the axis of rotation of the circular work station in synchronism with the movement of each workpiece as the latter is subjected to the laser beam. The disclosed embodiment is specifically and advantageously adapted for operation with workpieces in the nature of alkaline batteries, the anode external terminal plate of each of which is to be spot welded to an internal anode collector, and wherein the circular work station positions the anode plate of each battery at the focal point of the optical system.

Accordingly, it is a primary object of the present invention to provide a method and arrangement for spot welding components of primary alkaline batteries while the batteries are continuously conveyed through the arrangement. In order to attain this object, a stationary laser generates a collimated pulsed beam of radiation which is focused onto a spot on the anode terminal plate of each alkaline battery through the intermediary of an optical focusing system which is conveyed in synchronism with the movement of each battery as the latter is conducted through the laser beam, thereby spot welding the anode terminal plate to the internal anode collector without necessitating any disruption in the continuous movement of the battery through the arrangement.

BRIEF DESCRIPTION OF THE DRAWINGS

The foregoing and other objects and advantages of the novel heat treatment arrangement and method pursuant to the present invention may be readily understood by one skilled in the art, reference now being had to the following detailed description of a preferred embodiment of an arrangement, taken in conjunction with the accompanying drawings wherein identical reference numerals refer to similar elements throughout the several views; and in which:

FIG. 1 is a perspective view of an alkaline dry cell battery illustrating the anode terminal at the top thereof which is to be spot welded to an internal anode collector pursuant to the present invention;

FIG. 2 is a partially sectional view of the anode structure of the battery, illustrating the several anode components thereof which are to be spot welded together;

FIG. 3 schematically illustrates an optical focusing system representative of a beam of collimated radiation being directed onto the area to be spot welded while the optical focusing system and workpiece are conveyed in synchronism through the apparatus;

DETAILED DESCRIPTION OF THE DRAWINGS

Figure 4:
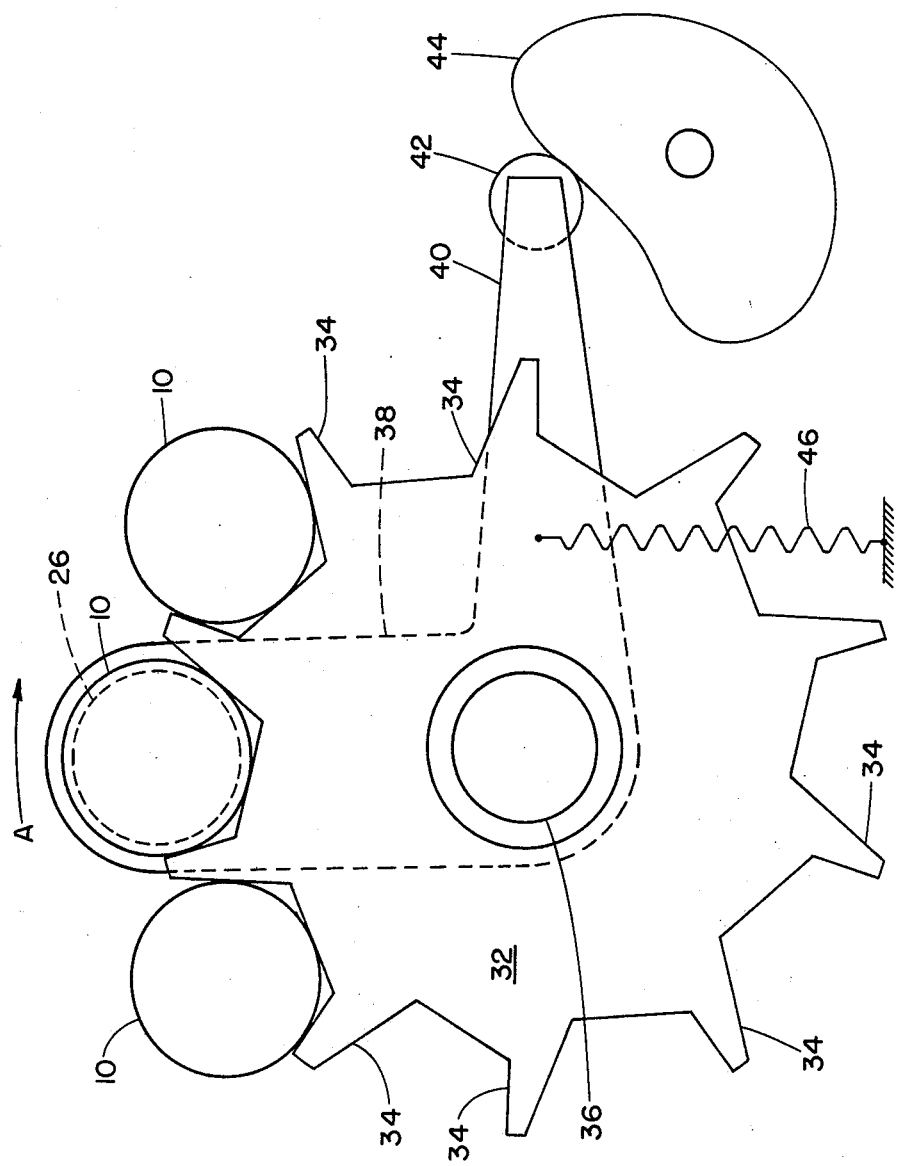
FIG. 4 is a right end view schematically illustrating the principle of operation of the spot welding arrangement of the present invention.

Referring to the drawings in detail, FIG. 1 illustrates an alkaline dry cell battery 10, such as is disclosed in Ralston et al. U.S. Pat. No. 3,663,301, and which is a workpiece of the type upon which a spot welding operation is to be performed in accordance with the teachings of the present invention. The dry cell includes an internal anode collector 12 constituted of a nail shaped element having a flat head 14, an elongated shank 16, and a downwardly converging, tapered pointed end 18. A disc-like flanged plate 20 forms the exterior anode of the battery, and is arranged in superposition upon and spot welded to the flat head 14 of the anode collector during the manufacture of the cell.

The present invention is specifically contemplated to perform the spot welding operation on the type of alkaline battery illustrated in FIGS. 1 and 2, although it should be appreciated that operations performed in accordance with the teachings of the present invention are not limited to spot welding, and may include annealing operations of the type disclosed by Charschan et al. U.S. Pat. No. 4,151,014. The invention may also be utilized to burn a hole in a workpiece, or to merely concentrate or focus a small spot of heat thereon so as to produce a localized chemical or physical reaction therein.

FIGS. 3 and 4 illustrate the principle of operation of the present invention. Referring first to FIG. 3, a collimated beam of radiation 22 is generated by a laser 24, and is directed onto a moving lens 26 behind which there is positioned a moving workpiece 28 at the focal point 30 of the lens. In accordance with a preferred embodiment, the laser is operated in a pulsed mode by a pulse control circuit 31, operated each time a workpiece is properly positioned in the arrangement, as described herein below in greater detail. During operation of the present invention, the lens 26 and workpiece 28 are conveyed in synchronism (direction of arrows A) through the laser beam, as indicated by the positions of the elements first at 26, 28 and 30 and later at 26', 28' and 30'. In this arrangement, the area S of the workpiece which is to be spot welded is continually positioned at the focal point of the lens 26.

In accordance with classical optical principles, a collimated beam of light directed along the optical axis of an optical system is focused at the focal point thereof regardless of whether the collimated beam of light is centered at the optical axis or is incident upon the optical system at a region located along the outer periphery thereof. Thusly, with the workpiece 28 positioned at the focal point of lens 26 and with the lens and workpiece moving in synchronism orthogonally relative to the collimated beam, the radiation remains focused on one fixed spot on the surface of the workpiece. As the lens and workpiece first enter the collimated beam of light along one peripheral edge, are then conveyed in synchronism therethrough in a manner wherein the collimated beam is incident along the optical axis of the lens, and are further conveyed such that the collimated beam of light is incident upon the opposite peripheral edge of the lens, the radiation will always be focused at the focal point of the lens at one fixed spot on the workpiece. Consequently, when the laser beam is sufficiently intense and the synchronously moving lens system and battery are maintained within the collimated beam of light for a sufficiently lengthy duration of time, the focused radiation will spot weld the area of the battery at the focal point of the lens.

In accordance with one embodiment of the present invention, the laser 24 is a pulsed Nd:YAG (neodymium:yttrium aluminum garnet) laser operating at a wavelength of 1060 nanometers produces pulses of radiation at a pulse repetition rate of approximately three hundred per minute with a pulse energy of 4 to 10 joules and a pulse width of three to five milliseconds.

FIG. 4 is a schematic illustration of the operation of the present invention wherein a work station consisting of a star wheel 32 having a plurality of paddle-shaped projections 34 spaced about its circumference is mounted for rotation on a shaft 35 in direction of arrow A. The star wheel 32 is adapted to receive and precisely position alkaline cells 10 between adjacent projections 34. An optical lens 36 is mounted by an arm 38 for reciprocation or to and fro oscillation about the same shaft 36 on which the star wheel rotates. A cam follower arm 40 extends at an approximately 90° angle from the arm 38 holding the lens 26 so as to form a generally angle-shaped lever arm. A cam follower roller 42 is mounted near the end of the cam follower arm 40 and is biased into contact with the camming surface of a rotating cam 44 by a tension spring 46. The speed of rotation of the cam 44 is mechanically synchronized with the speed of rotation of the star wheel 32 so that the cam 44 rotates one complete revolution for each workpiece which passes past the lens 26.

During the operation of the arrangement laser 24 is positioned in the plane of the drawing of FIG. 3, and directs a laser pulse through lens 26 onto each workpiece conducted through the laser beam by the projections 34 on the star wheel 32. The contact of roller 42 with the surface of the cam 44 causes the lens 26 to oscillate as to move in synchronism with the workpiece for a predetermined time interval while the workpiece is located in the beam of the laser so that the pulse of the laser radiation remains focused by the lens to a point spot on the surface of the workpiece, thereby forming a spot weld at that location (Point S in FIG. 2) as the workpiece is conducted over the top of the star gear. After completion of the welding operation on one workpiece, the rapidly rotating cam 44 causes the lens 26 to pivot counterclockwise (as shown in FIG. 3) under the biasing effect of spring 46 so as to align itself with the subsequent workpiece being conducted towards the top of the star wheel 32 by a successive projection 34. The lens then moves in synchronized or aligned motion with that workpiece while a pulse of laser radiation is transmitted through the former from the stationary laser 24 to effect the spot welding thereon. This operation is then repeated with each successive workpiece.

Figure 5:
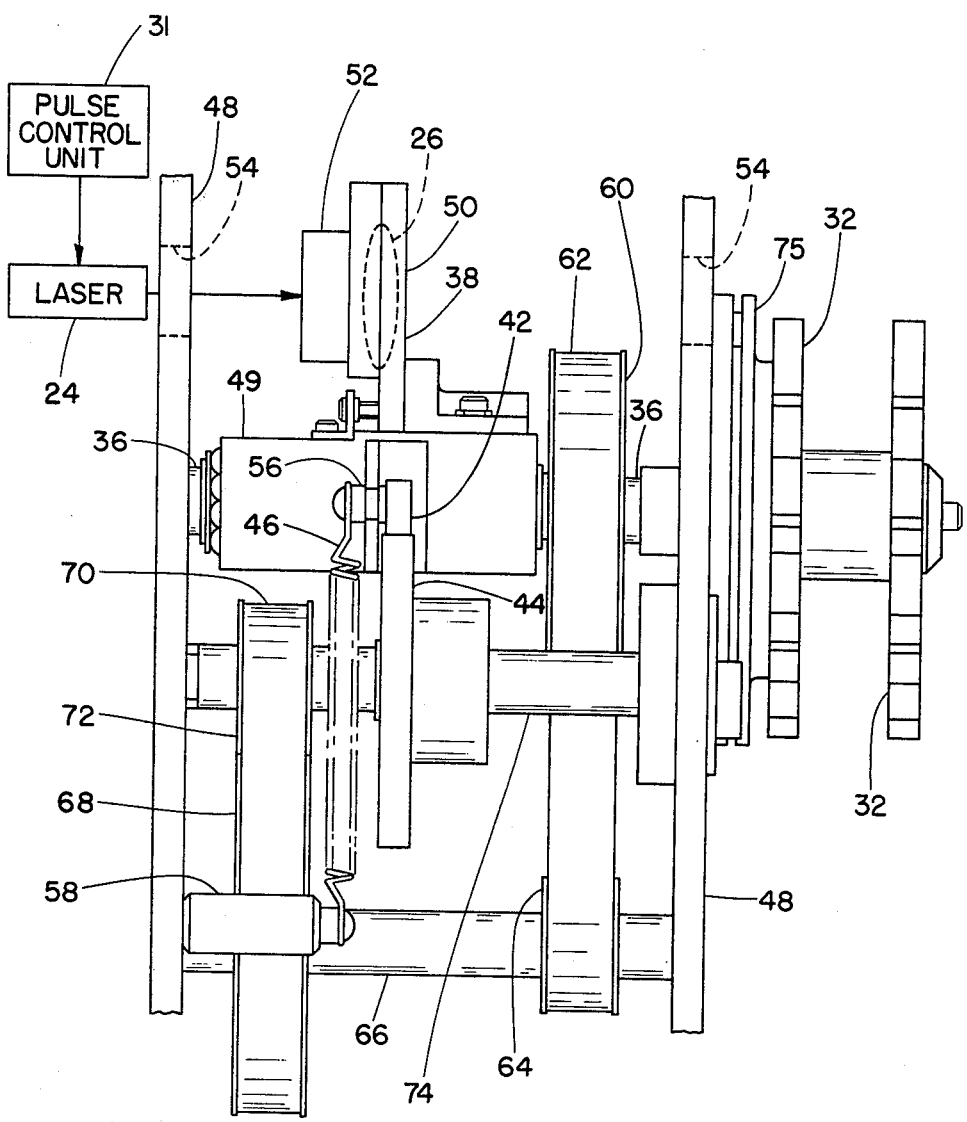
FIG. 5 illustrates an elevational view of one embodiment of an arrangement for conveying successive workpieces and an optical focusing system for a pulsed laser beam in synchronism during the spot welding operation.
Figure 6:
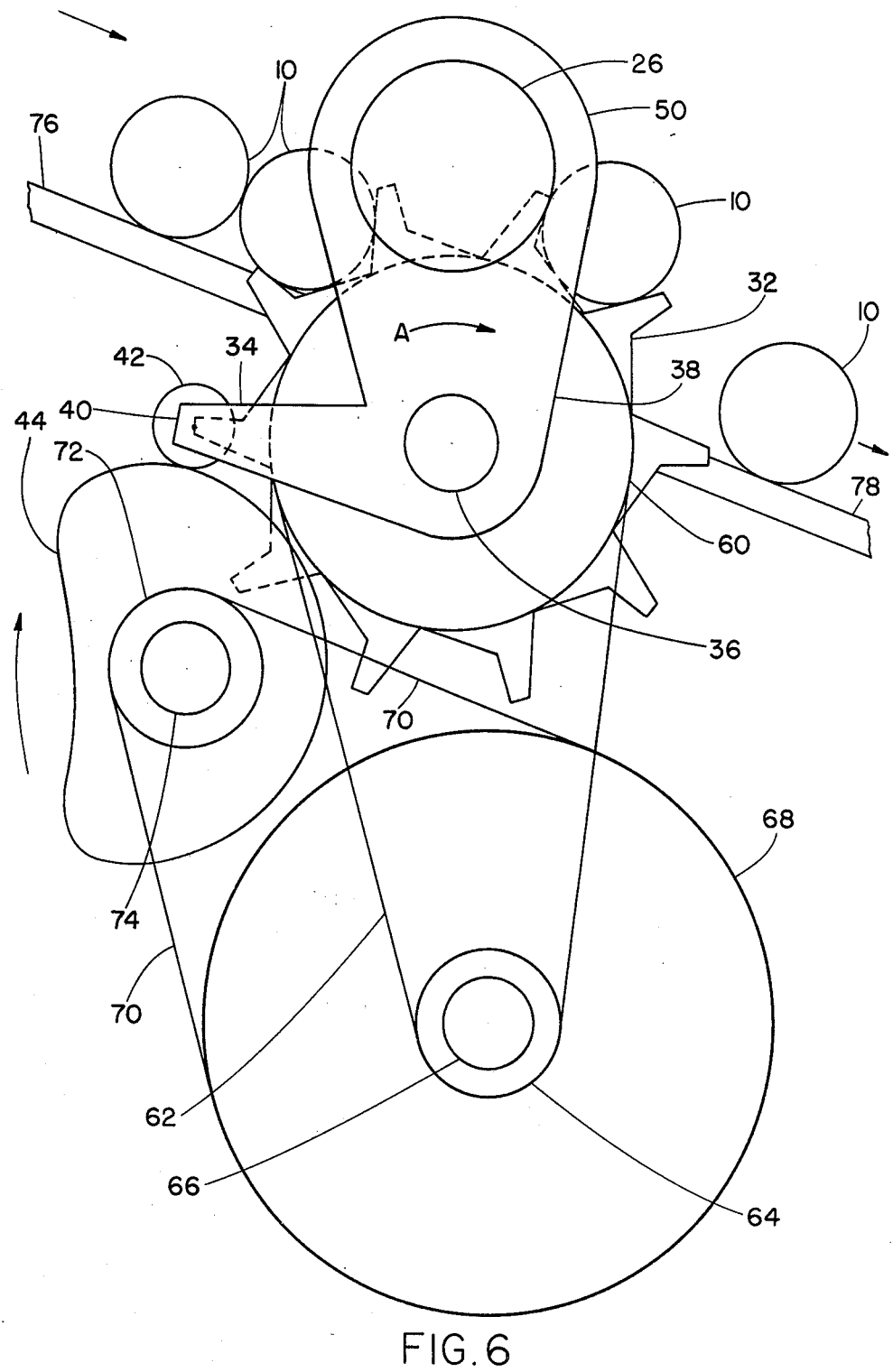
FIG. 6 is an elevational left end view of the apparatus of FIG. 5, illustrating further details of the overall arrangement.

An arrangement implementing the principles of operation of the present invention as shown in FIGS. 3 and 4 is illustrated in FIGS. 5 and 6. The arrangement includes a pair of parallel spaced star wheels 32, distanced apart by somewhat less than the length of an alkaline cell, on the right hand end of a rotating shaft 36. Left and right mounting frame plates 48 form a frame for the machine and the rotating shaft 36 is journaled therebetween. Lens 26 is rotationally supported on the rotating shaft by a journal bearing 49 mounted on the shaft in a manner such that the journal and lens supported thereby are free to rotate about the shaft but do not rotate therewith. Arm 38 supports the lens mounting structure 50 for pivotal movement about the journal bearing 49 in a manner similar to the arrangement shown in FIG. 4. Lens 26 is supported in a suitable lens mounting structure 50 and may, for instance, include an O-ring mounted along the circumference of the lens. A lens shield 52 projects to the left in the direction from which the laser beam is incident thereon, although in alternative embodiments the shield may be modified or even omitted entirely.

Both mounting frame plates 48 include through apertures 54 so as to allow the collimated radiation beam generated by laser 24 to pass through the focusing lens 26 towards the workpiece 10 which held in position by the projections 34 on the adjacently spaced star wheels 32. A cam follower arm 40 projects out of the plane of the drawing as shown in FIG. 4, and a cam follower roller 42 carried thereby is biased against the camming surface of a rotating cam 44 by a tension spring 46 having the respective ends thereof fastened to a mounting lug 56 on the cam follower arm 40 and to a second mounting lug 58 mounted on the left frame plate 48. The mounting and cam follower arms 38 and 40 are shown to appear slightly different in FIGS. 4 and 6 as FIG. 4 is primarily a schematic illustration of the arrangement intended to merely demonstrate the principles of the operation of the present invention. Also, cam follower arm 40 projects oppositely in FIGS. 4 and 6 since those drawings represent, respectively, right and left end views of the arrangement.

As illustrated in both FIGS. 5 and 6, a relatively large-diameter drive gear 60 is fixedly mounted on shaft 36 such that it is carried in rotation therewith, and drives a gear belt 62 which extends to a relatively small-diameter drive gear 64 fixedly mounted on a shaft 66 in a rotational drive speed step-up arrangement.

In this rotational speed step-up arrangement, the shaft 66 on which the reduced diameter gear 64 is mounted rotates at a faster but synchronized rate relative to the first shaft 36. A second relatively large-diameter drive gear 68 is fixedly mounted on the second shaft 66 for rotation therewith, and drives a second drive belt 70 which extends to a second relatively small-diameter gear 72 fixedly mounted on a third shaft 74. The overall speed step-up arrangement described hereinabove causes the third shaft 74 to rotate in synchronism with the first and second shafts but at a faster rate than the second shaft. The diameter and number of teeth on gears 60, 64, 68 and 72 are selected to cause the third shaft 74 to rotate one complete revolution for each workpiece station or projection 34 on the star wheels 32 which passes the optical axis of the laser beam. Accordingly, cam 44 is placed in rotation by the shaft 74 so that the synchronized cam rotates one complete revolution for each workpiece 10 passing through the focused laser beam 22. In alternative embodiments there may be employed other types of drive gear arrangements, consideration being given to the requirement that rotation of the cam must be synchronized with rotation of the workpiece support, and in which the cam must rotate one complete revolution for each workpiece station traversing the laser beam.

In further embodiments it is possible to contemplate that there may be utilized other sources of radiation, such as a MASER, operating at different frequencies of the electromagnetic spectrum. Moreover, alternative kinds of focusing systems, such as a reflective system, may also be implemented herein, and the choice of system to some degree will depend upon the wavelength of radiation being employed in the arrangement.

In its simplest form, the lens system is a single element lens, and is positioned whereby the distance between the lens 26 and a workpiece 10 positioned in the laser beam by the dual arrangement of star wheels 32 equals the focal length of the lens. In this regard, a circular plate 75, dimensioned to allow the focused beam to pass therethrough, may be positioned adjacent to the star wheel 32 closest to the laser beam to precisely position the anode plate of the workpiece against plate 75 at the focal point of the beam.

FIG. 6 illustrates a gravity feed workpiece ramp 76 at the left side of the star wheel 32 on which batteries which are to be spot welded roll down into the workpiece receiving stations formed between adjacent projections 34 along the circumference of the star wheels. A second gravity feed ramp 78 receives the alkaline cells from the star wheels 32 after completion of the spot welding operation. Each of the ramps 76, 78 may be positioned within the space defined intermediate the two spaced star wheels 32.

While a preferred embodiment of the present invention and several modifications thereof have been described in detail, it should be apparent to one of ordinary skill in the art that many other embodiments are encompassed within the scope fo the invention. More specifically, operations performed in accordance with the present invention are not limited to spot welding, and may include selective annealing operations, in effect, operations in which a hole is selectively burned in a workpiece, or operations wherein a small spot of heat is generated on the surface of a workpiece to cause a localized chemical or physical reaction at that location.

What is claimed is:

1. Arrangement for treating a moving workpiece with a beam of radiation, comprising:
   a. means in said arrangement for generating a generally collimated beam of said radiation and projecting said beam towards said workpiece;
   b. means for conveying said workpiece through said beam of radiation;
   c. an optical focusing system comprising at least one lens positioned to project the beam from said beam generating means towards said moving workpiece, said workpiece being substantially located in the plane of the focal point of said optical focusing system;
   d. and means for moving said lens in synchronism with said workpiece and in a path which is in parallel relationship to the path of movement of said workpiece while said workpiece and said lens traverse said beam of radiation.

2. Arrangement as claimed in claim 1, said generating means comprising laser means for producing said collimated beam of radiation.

3. Arrangement as claimed in claim 2, comprising means for operating said laser means in a pulsed mode to produce at least one pulse of collimated radiation for each workpiece conveyed through said beam.

4. Arrangement as claimed in claim 1, said generating means producing an intense beam of said collimated radiation for spot welding said workpiece at the focal point of said beam.

5. Arrangement as claimed in claim 4, said workpiece comprising a battery having an external anode terminal plate adapted to be spot welded to an internal anode collector by said beam of radiation, said conveying means comprising means for positioning the anode plate of the battery at substantially the focal point of said optical focusing system.

6. Arrangement as claimed in claim 1, said means for conveying a workpiece comprising means for sequentially conveying a plurality of said workpiece through said beam of radiation.

7. Arrangement as claimed in claim 6, said conveying means comprising a rotatable circular work station having projecting means for arcuately conveying said workpiece along its circumference, said focusing system being mounted for oscillation about an axis; and cam means operatively engaging said means for moving said optical focusing system for periodically oscillating said lens in parallel synchronism with said moving workpieces.

8. Arrangement as claimed in claim 7, said lens being mounted for oscillation substantially perpendicular to the axis of rotation of said circular work station.

9. Arrangement as claimed in claim 8, each said workpieces being a battery having an external anode terminal plate adapted to be spot welded to an internal anode collector by said beam, said conveying means comprising means for positioning the anode plate of each said battery at substantially the focal point of said optical focusing system.

10. A method for treating a moving workpiece with a beam of radiation, comprising the steps of:
    a. generating a generally collimated beam of radiation with radiation generator;
    b. conveying said workpiece through said beam of radiation;
    c. and optically focusing said beam with a lens on a single spot on said workpiece for a predetermined period of time from said radiation beam while said workpiece traverses said beam, said lens and said workpiece being moved in synchronism and parallel relationship to each other so as to focus said beam of radiation onto a single spot on said workpiece for a predetermined period of time.

11. A method as claimed in claim 10, comprising utilizing a laser to produce said collimated beam of radiation.

12. A method as claimed in claim 11, comprising operating said laser in a pulsed mode to produce a pulse of collimated radiation which is directed through said optical focusing system onto the workpiece.

13. A method as claimed in claim 10, comprising spot welding said workpiece through said focused beam of collimated radiation.

14. A method as claimed in claim 10, comprising sequentially conveying a plurality of said workpieces through said beam of radiation.

15. A method for treating a moving workpiece as claimed in claim 14, comprising sequentially conveying said workpieces to a circular work station, rotating said circular work station while oscillating said lens in parallel relationship to and in synchronism with the workpieces on said work station so as to focus said beam on said single spot on one said workpiece.

16. A method as claimed in claim 15, each said workpiece being a primary battery having multi-component anode structure, comprising spot welding the components of said anode structure of each said primary battery through said focused beam of radiation.

* * * * *